United States Patent
Tsutsumi

(10) Patent No.: US 7,952,589 B2
(45) Date of Patent: May 31, 2011

(54) DATA PROCESSING APPARATUS AND METHOD THEREOF

(75) Inventor: Takayuki Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 11/565,856

(22) Filed: Dec. 1, 2006

(65) Prior Publication Data

US 2007/0126744 A1 Jun. 7, 2007

(30) Foreign Application Priority Data

Dec. 7, 2005 (JP) ................................. 2005-353986

(51) Int. Cl.
*G06F 12/00* (2006.01)
(52) U.S. Cl. ........ 345/564; 345/536; 345/557; 345/566; 345/567; 345/572; 345/601; 711/202
(58) Field of Classification Search .................. 345/566, 345/567
See application file for complete search history.

(56) References Cited

U.S. PATENT DOCUMENTS

| | | | |
|---|---|---|---|
| 5,623,627 A * | 4/1997 | Witt ............................. | 711/122 |
| 6,397,297 B1 * | 5/2002 | Sperber et al. ................. | 711/122 |
| 7,205,994 B2 * | 4/2007 | Fu et al. ........................ | 345/557 |
| 2004/0078544 A1 * | 4/2004 | Lee et al. ....................... | 711/202 |
| 2006/0114528 A1 | 6/2006 | Ito | |

FOREIGN PATENT DOCUMENTS

| EP | 0969413 | 1/2000 |
|---|---|---|
| GB | 1595122 | 8/1981 |

* cited by examiner

*Primary Examiner* — Antonio A Caschera
(74) *Attorney, Agent, or Firm* — Cowan, Liebowitz & Latman, P.C.

(57) ABSTRACT

A data processing apparatus generates a memory address corresponding to a first memory, and interpolates data read out from the first memory. The data processing apparatus selects a part of the memory address, checks if the first memory stores data corresponding to the selected part of the memory address, and transfers the data, for which it is determined that the first memory does not store the data, and which corresponds to the part of the memory address, from a second memory to the first memory. The data processing apparatus determines to change a part to be selected of the memory address based on the checking result indicating that the first memory does not store the data corresponding to the selected part of the memory address, and changes the part of the memory address corresponding to the characteristics of the memory address.

14 Claims, 7 Drawing Sheets

DATA PROCESSING APPARATUS AND METHOD THEREOF

BACKGROUND OF THE INVENTION

1. Field of the Invention

The present invention relates to a data processing technique in color space conversion of image data.

2. Description of the Related Art

In recent years, color input devices such as scanners, digital cameras, video cameras, and the like have prevailed as input devices. Also, various color output devices such as color printers using an ink-jet system, dye sublimation system, electrophotographic system, and the like have prevailed as output devices. These color input and output devices respectively have unique color spaces (device color spaces). In order to print data read by an input device using an output device, processing for converting the color space of the input device into that of the output device (to be referred to as "color space conversion" hereinafter) is required.

For example, upon printing RGB image data scanned by a scanner, the RGB color space of the scanner is converted into a standard color space (e.g., Adobe RGB proposed by Adobe Systems Incorporated). After that, the standard color space is converted into a CMYK color space defined by cyan, magenta, yellow, and black as that of color materials (inks or toners) of a printer.

Even in identical RGB color spaces such as RGB color spaces of a scanner and monitor, if they have different color space characteristics (color gamuts), they require color conversion. More specifically, when a monitor displays an image scanned by a scanner, conversion from a scanner RGB color space to a monitor RGB color space is required to attain color matching.

As one of such color conversion processing methods, a color conversion method that combines a three-dimensional lookup table (3D-LUT) and interpolation operations is known. As an interpolation operation method, tetrahedral interpolation disclosed in GB1595122, EP0969413, or the like is known because of an operation volume, color continuity between neighboring tetrahedrons, and high reproducibility of a gray axis.

However, with the color conversion method based on a combination of the 3D-LUT and interpolation operations, when the number of grid points (to be referred to as "number of grids" hereinafter) per axis of the LUT is increased to improve the color conversion precision, the size of the LUT increases to the third power for three dimensions. Also, a digital camera to which a color filter other than RGB is added to improve the color reproducibility is available. In this case, the size of the LUT increases to the fourth power of the number of grids, thus requiring a huge memory size.

On the other hand, some output devices such as printers or the like use many color materials (inks) to improve the color reproducibility, gray balance, and granularity. In this case, the LUT size increases in proportion to the number of color materials.

For these reasons, in order to reduce the cost of the LUT, various proposals have been made. For example, a color conversion method which hierarchizes an LUT, stores all grid data of the LUT in a storage (memory) which has low cost but low speed, and loads only data required in arithmetic operations onto a high-speed cache has been examined.

However, in such a cache mechanism, the cache hit rate determines the total performance, and a relatively large cache size must be assured to complete the process within a predetermined period of time for every input data. Hence, a problem of poor cost performance is posed. Furthermore, such a problem is similarly posed when an LUT is used in processing other than color space conversion.

SUMMARY OF THE INVENTION

It is an object of the present invention to improve the cost performance of processing using an LUT.

It is another object of the present invention to reduce the cache size while maintaining a high hit rate.

It is still another object of the present invention to provide a data processing apparatus for generating a memory address corresponding to a first memory based on input image data, and interpolating data read out from the first memory, comprising:

a selection unit configured to select a part of the memory address;

a checking unit configured to check if the first memory stores data corresponding to the part of the memory address selected by the selection unit;

a transfer unit configured to transfer the data, for which it is determined by the checking unit that the first memory does not store the data, and which corresponds to the part of the memory address, from a second memory to the first memory;

a determination unit configured to determine to change a part of the memory address to be selected by the selection unit based on a checking result of the checking unit indicating that the first memory does not store the data corresponding to the part of the memory address selected by the selection unit; and a change unit configured to change the part of the memory address to be selected by the selection unit so as to select a part of the memory address corresponding to characteristics of the memory address.

It is yet another object of the present invention to provide a data processing method for generating a memory address corresponding to a first memory based on input image data, and interpolating data read out from the first memory, comprising:

selecting a part of the memory address;

checking if the first memory stores data corresponding to the selected part of the memory address;

transferring the data, for which it is determined that the first memory does not store the data, and which corresponds to the part of the memory address, from a second memory to the first memory;

determining to change a part to be selected of the memory address based on a checking result indicating that the first memory does not store the data corresponding to the selected part of the memory address; and changing the part to be selected of the memory address so as to select a part of the memory address corresponding to characteristics of the memory address.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of an address conversion signal of the information processing apparatus according to one embodiment of the present invention; and FIG. 8 shows an operation example of the LUT address conversion unit 203 which forms the information processing apparatus according to one embodiment of the present invention.

DESCRIPTION OF THE EMBODIMENTS

Preferred embodiments of the present invention will NOW be described in detail in accordance with the accompanying drawings.

First Embodiment

1. Hardware Arrangement of Information Processing Apparatus

Figure 1:
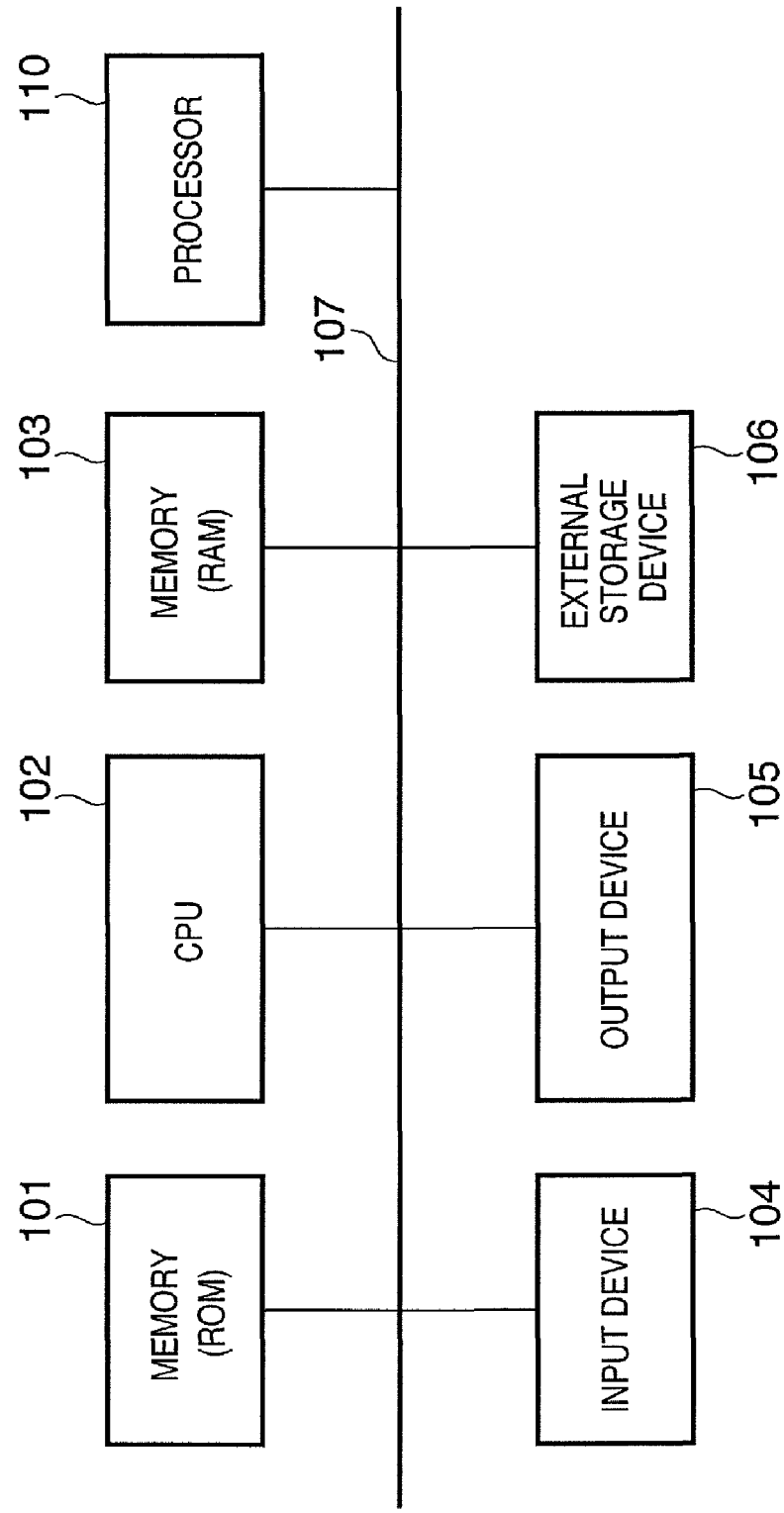
FIG. 1 is a block diagram showing the hardware arrangement of an information processing apparatus according to one embodiment of the present invention.

FIG. 1 is a block diagram showing the hardware arrangement of an information processing apparatus according to the first embodiment of the present invention.

Referring to FIG. 1, reference numeral 101 denotes a memory (ROM); 102, a CPU; 103, a memory (RAM); 104, an input device; 105, an output device; 106, an external storage device; and 107, a bus. The ROM 101 stores control programs required to implement the information processing functions according to this embodiment and data used in these control programs. These control programs and data are loaded onto the memory 103 as needed via the bus 107 under the control of the CPU 102, and are executed by the CPU 102. Reference numeral 110 denotes a processor which implements a color space conversion function and an LUT address conversion function, as will be described later.

The input device 104 is used to input various kinds of information. Assume that various kinds of information include image data (input data) from color input devices such as a scanner, digital camera, video camera, and the like in addition to input signals from a keyboard, mouse, and the like, which are used to input user's instructions.

The output device 105 is used to output image data (output data) that has undergone the color space conversion, and output destinations to which image data is to be output via the output device 105 include color output devices such as a color printer, monitor, and the like.

2. Functional Arrangement of Information Processing Apparatus

Figure 2:
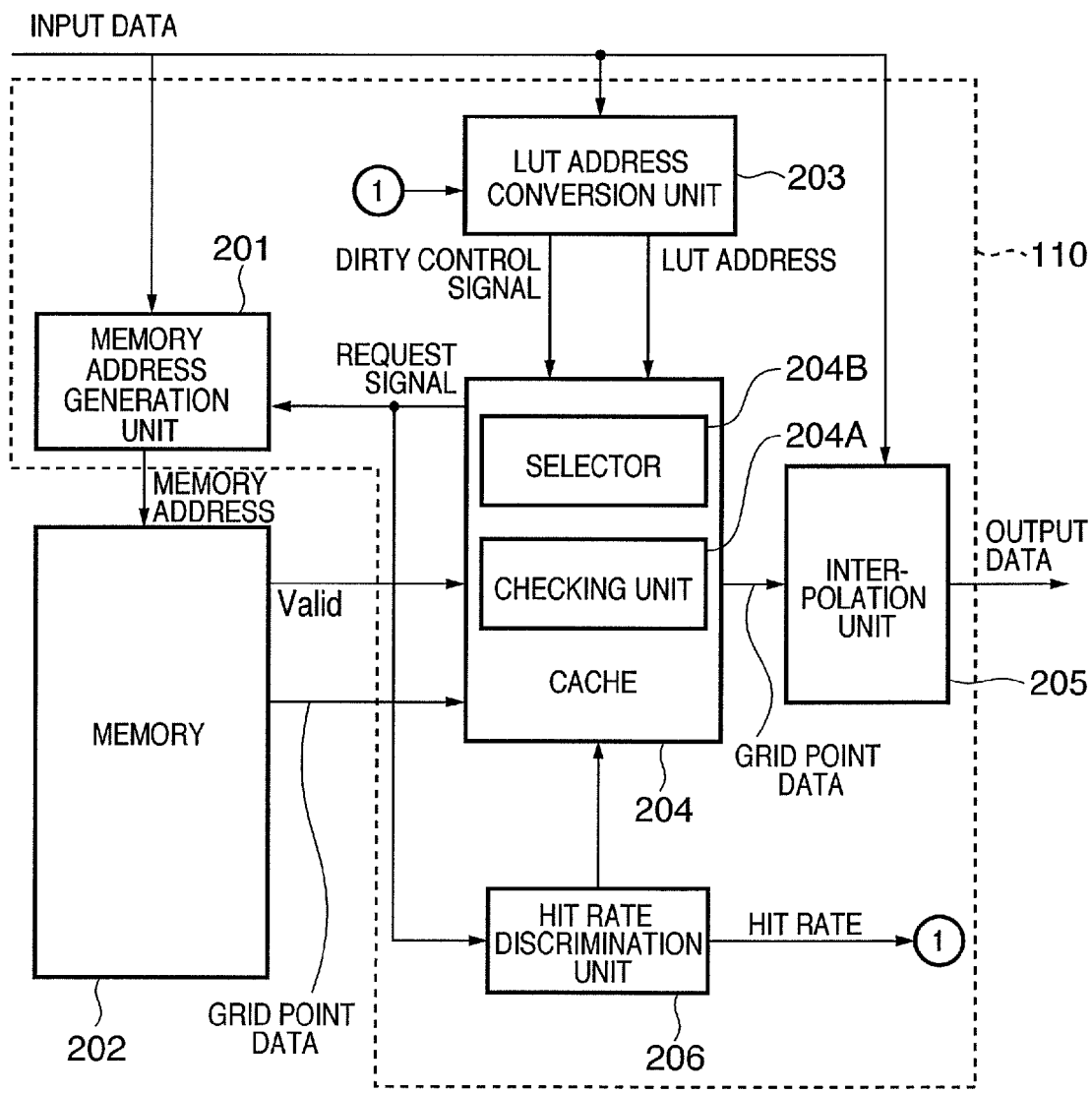
FIG. 2 is a block diagram showing the functional arrangement of the information processing apparatus according to one embodiment of the present invention.

FIG. 2 shows the arrangement of the processor 110 in the information processing apparatus shown in FIG. 1. The information processing function to be implemented by the processor 110 includes a color space conversion function and LUT address conversion function.

Referring to FIG. 2, reference numeral 201 denotes a memory address generation unit, which generates an address (memory address) required to access a memory unit 202 upon color space conversion. Note that access to the memory unit 202 is executed upon reception of a request signal from a cache unit 204 when it does not store desired grid point data.

Reference numeral 202 denotes a memory unit (corresponding to the RAM 103 in FIG. 1), which stores all grid point data of an LUT.

Reference numeral 203 denotes an LUT address conversion unit, which generates an address (LUT address) required to access the cache unit 204 based on input data from the input device 104. The LUT address is generated using the upper bits of respective input axes of the input data. The LUT address conversion unit 203 also generates a dirty control signal to be output to the cache unit 204 upon execution of the LUT address conversion processing (to be described later).

Reference numeral 204 denotes a cache unit which selects corresponding cache data (grid point data) based on the upper bits (address tag) and lower bits (index) of the LUT address upon color space conversion.

More specifically, the cache unit 204 has a selector 204B, which selects the upper bits of the LUT address. The cache unit 204 also has a checking unit 204A, which compares the address tag and cache tag to determine whether or not the cache unit 204 already stores grid point data. That is, whether or not the cache unit 204 stores grid point data is determined based on the presence/absence of the cache tag which matches the upper bits (address tag) of the LUT address. If it is determined that the cache unit 204 stores the grid point data, the grid point data stored in the cache unit 204 is output in correspondence with the LUT address (index).

On the other hand, if it is determined that the cache unit 204 does not store grid point data, the checking unit 204A outputs a request signal to the memory address generation unit 201 to access the memory unit 202 based on the memory address (tag) generated by the memory address generation unit 201.

The cache unit 204 reads the grid point data output from the memory unit 202 in response to the request signal, and stores it as cache data together with the address tag. In this case, the cache unit 204 outputs the grid point data read from the memory unit 202.

Note that the memory address generation unit 201 can easily calculate the address of the memory unit 202 by adding the base address of the memory unit 202 to the LUT address. When the number of grids is not a power of 2 like a 17-grid LUT, complicated arithmetic operations are often required to generate a memory address so as to eliminate a wasteful memory space.

Reference numeral 205 denotes an interpolation unit which calculates the weighted mean of the grid point data output from the cache unit 204 from the lower bits of the respective input axes of the input data, and outputs the converted data as output data.

Reference numeral 206 denotes a hit rate discrimination unit which calculates a hit rate in the cache unit 204 upon color space conversion. The LUT address conversion unit 203 refers to the calculated hit rate when it executes LUT address conversion processing for changing a bit sequence.

3. Functional Arrangement of LUT Address Conversion Unit 203

Figure 3:
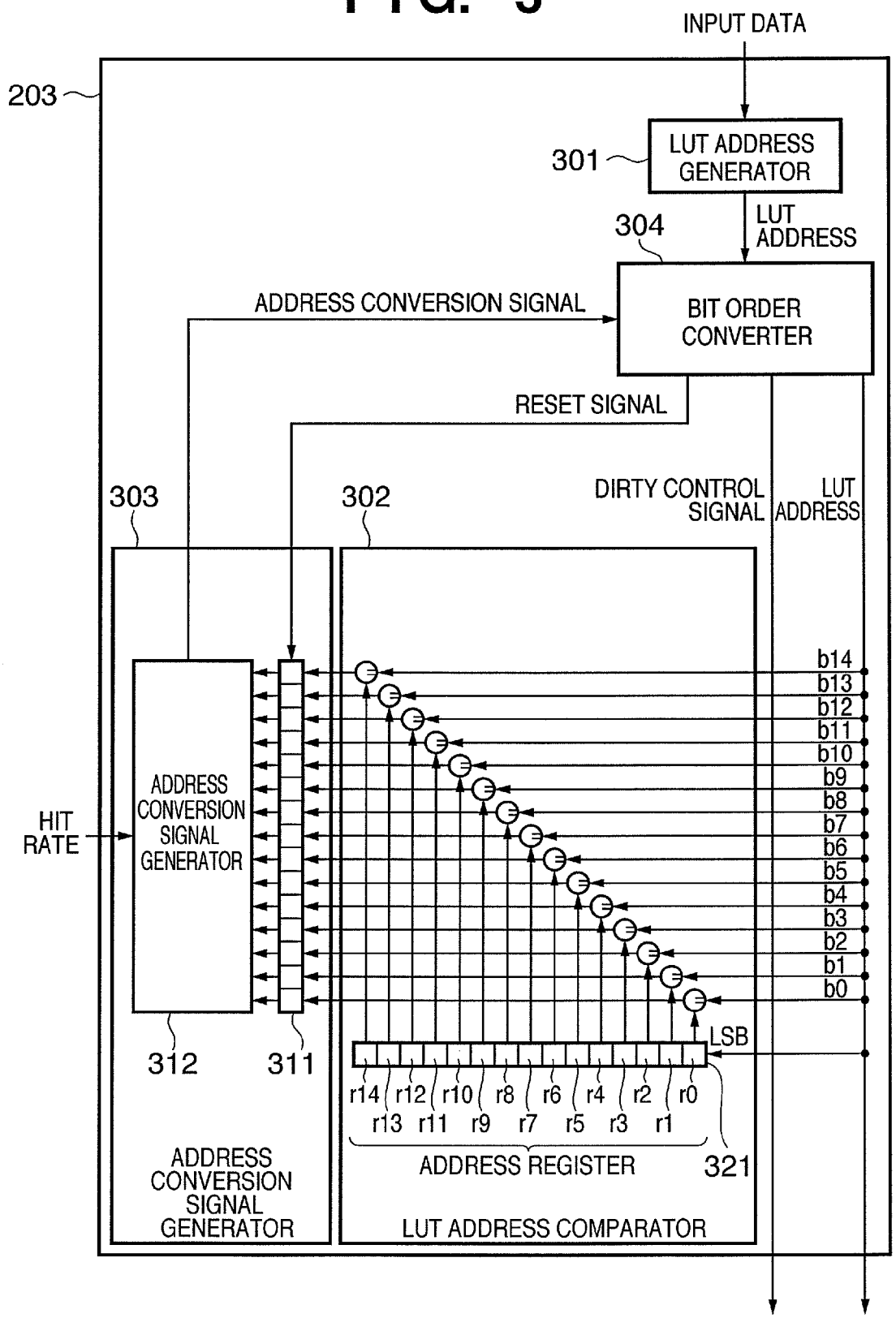
FIG. 3 is a block diagram showing the arrangement of an LUT address conversion unit 203 which forms the information processing apparatus according to one embodiment of the present invention.

The detailed functional arrangement of the LUT address conversion unit 203 included in FIG. 2 will be described below using FIG. 3.

The LUT address conversion unit 203 comprises an LUT address generator 301, LUT address comparator 302, bit order determiner 303, and bit order converter 304. The bit order determiner 303 comprises change frequency counters 311 for respective bits and an address conversion signal generator 312.

The LUT address generator 301 generates an LUT address based on input data upon color space conversion.

Upon reception of an address conversion signal from the bit order determiner 303 (to be described later), the bit order converter 304 converts the bit order of the LUT address generated by the LUT address generator 301, and outputs the converted LUT address. On the other hand, when the bit order converter 304 does not receive any address conversion signal, it outputs the LUT address generated by the LUT address generator 301. Note that this embodiment controls the LUT address to be sequentially output from the bit order converter 304 every 15 bits.

Upon reception of the address conversion signal, the bit order converter 304 outputs a reset signal to the change frequency counters 311 (to be described later) to reset them. Furthermore, the bit order converter 304 outputs a dirty control signal to the cache unit 204 to invalidate the cache tag.

The LUT address comparator 302 compares the LUT address (15 bits) currently output from the bit order converter 304 with that previously output from the bit order converter 304 for respective bits. Note that the LUT address previously output from the bit order converter 304 is stored in an address register 321 in the LUT address comparator 302. The LUT address comparator 302 outputs '0' for matching LUT address bits and '1' for mismatching LUT address bits as a result of comparison for respective bits.

The bit order determiner 303 comprises the change frequency counters 311 for respective bits, and counts the comparison results ('0' or '1') for respective bits output from the LUT address comparator 302. In this way, the bit order determiner 303 can detect the characteristics (bits which have large change frequencies) of the LUT address generated by the LUT address generator 301. The count results are input to the address conversion signal generator 312 in the bit order determiner 303.

The address conversion signal generator 312 monitors the hit rate calculated by the hit rate discrimination unit 206, and sorts the count results of the change frequency counters 311 when it is determined that the calculated hit rate is less than a predetermined hit rate. The address conversion signal generator 312 selects a predetermined number of upper bits in descending order of count value (the number of bits to be selected depends on that of the index (the lower bits of the LUT address), and outputs the bit numbers indicating the selected bit positions as an address conversion signal.

Figure 4:
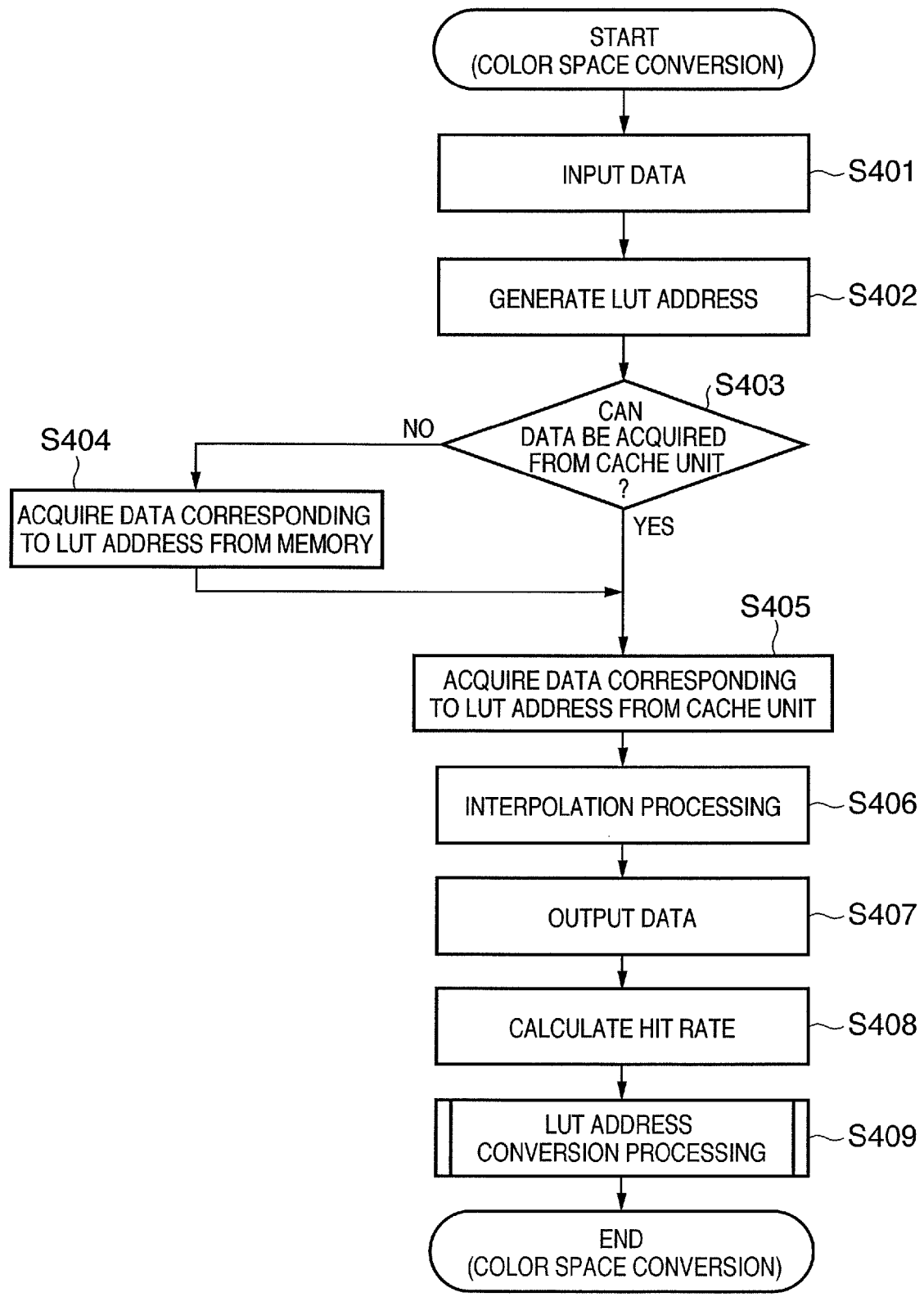
FIG. 4 is a flowchart showing the procedure of color space conversion in the information processing apparatus according to one embodiment of the present invention.

4. Procedure of Processing in Information Processing Apparatus 4.1 Procedure of Color Space Conversion Processing The procedure of the color space conversion in the information processing apparatus according to this embodiment will be described below using FIG. 4.

In step S401, input data which is to undergo color space conversion is input via the input device 104. In step S402, the LUT address generator 301 generates an LUT address based on the input data.

The checking unit 204A checks in step S403 if grid point data corresponding to the 15-bit LUT address can be acquired from the cache unit 204. If it is determined in step S403 that the corresponding grid point data can be acquired from the cache unit 204, the process advances to step S405. This checking processing is done based on the upper bits (address tag) of the LUT address. In step S405, the cache unit 204 is accessed based on the LUT address (index), and the corresponding grid point data is acquired from the cache unit 204.

On the other hand, if it is determined in step S403 that the corresponding grid point data cannot be acquired from the cache unit 204, the process advances to step S404. In step S404, a request signal is sent to the memory address generation unit 201 so as to acquire grid point data corresponding to the LUT address (tag) from the memory unit 202. Upon reception of the request signal, the memory address generation unit 201 generates a memory address where the grid point data that cannot be acquired is stored, and accesses the memory unit 202. Note that the address of the memory unit 202 can be calculated by adding the LUT address to the base address of the memory unit 202, as described above.

The memory unit 202 sends the grid point data stored at the generated memory address to the cache unit 204. As a result, the cache unit 204 can acquire, from the memory unit 202, the grid point data which is determined in step S403 not to be acquired, and can store that grid point data as cache data.

In step S406, the grid point data acquired by the cache unit 204 is sent to the interpolation unit 205. The interpolation unit 205 executes predetermined interpolation operations.

In step S407, the grid point data that has undergone the interpolation operations is output as output data. Furthermore, the hit rate is calculated in step S408. As described above, according to this embodiment, when the LUT address is input to the cache unit 204, and the cache unit does not store corresponding grid point data, a request signal is output. Therefore, the hit rate discrimination unit 206 can calculate the hit rate by monitoring the request signal.

In step S409, LUT address conversion processing is executed. Note that details of the LUT address conversion processing will be described below.

4.2 Procedure of LUT Address Conversion Processing

Figure 5:
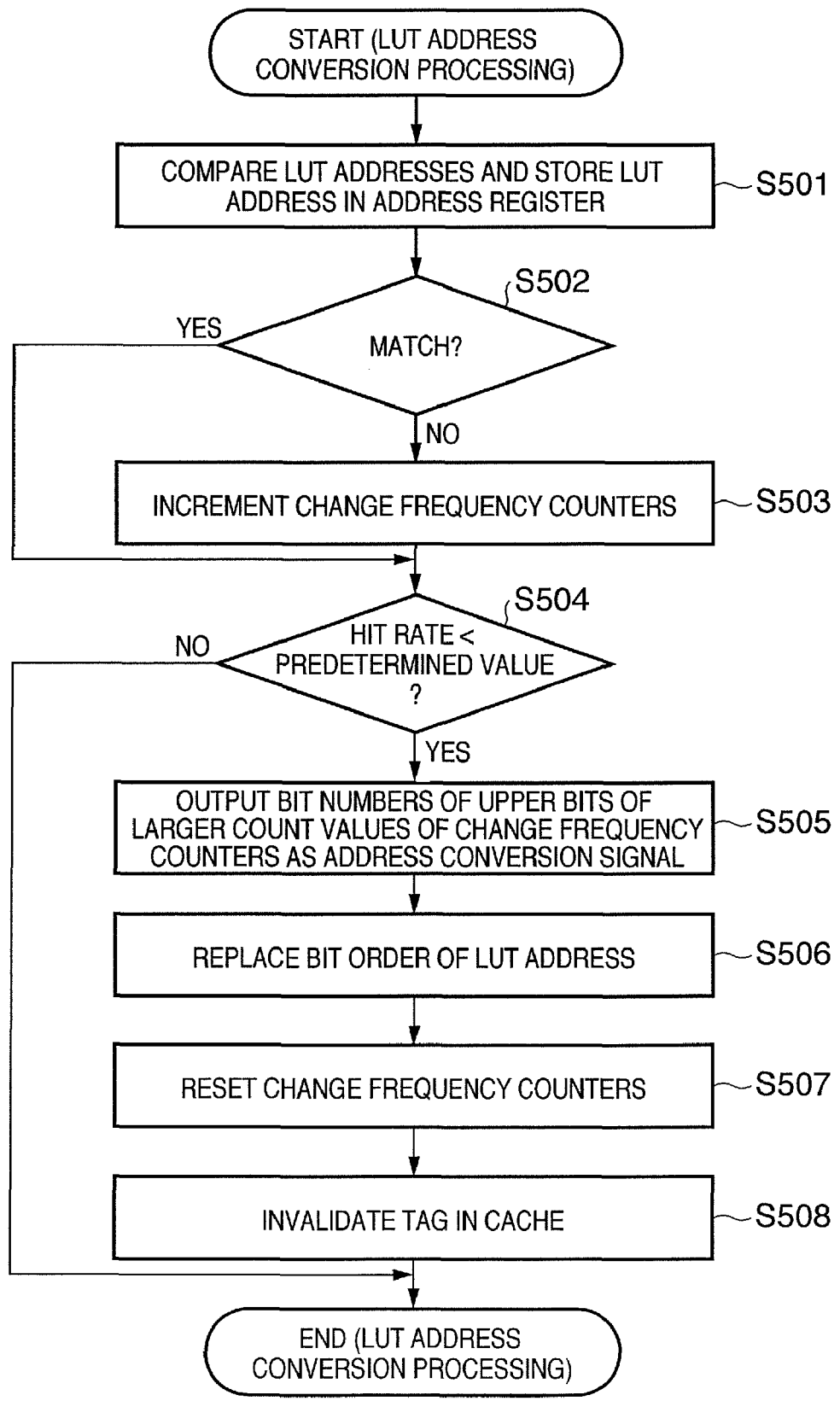
FIG. 5 is a flowchart showing the procedure of LUT address conversion processing in the information processing apparatus according to one embodiment of the present invention.

The procedure of the LUT address conversion processing (step S409) in the information processing apparatus according to this embodiment will be described below using FIG. 5.

In step S501, the LUT address comparator 302 compares bit by bit the currently generated LUT address for 15 bits with the previously generated LUT address for 15 bits. Upon completion of the comparison processing, the currently generated LUT address for 15 bits is stored in the address register 321, and is used in the comparison processing as the previous LUT address for 15 bits when the next LUT address for 15 bits is generated.

If it is determined in step S502 as a result of the comparison processing that corresponding bits match, '0' is input to the change frequency counter 311 in correspondence with the bit of interest. On the other hand, if it is determined as a result of the comparison processing that corresponding bits do not match, '1' is input to the change frequency counter 311 in correspondence with the bit of interest. As a result, if the corresponding bits do not match, the corresponding bit of the change frequency counter 311 is incremented in step S503.

In step S504, the hit rate (calculated in step S408 in FIG. 4) at the time of the color space conversion for the current LUT address for 15 bits is referred to. If the hit rate is equal to or higher than a predetermined value, the LUT address conversion processing ends.

On the other hand, if the hit rate is less than the predetermined value, the process advances to step S505, and the address conversion signal generator 312 outputs the bit numbers of upper bits with larger count values of the change frequency counters as an address conversion signal.

The address conversion signal output from the address conversion signal generator 312 is input to the bit order converter 304. In step S506, the bit order converter 304 replaces the bit order of the LUT address for 15 bits which is to undergo next color space conversion. More specifically, an index is generated using the bits (those which have large change frequencies) at the bit positions indicated by the address conversion signal, and a tag is generated using the remaining bits. That is, the bits at the bit positions indicated by the address conversion signal are replaced to lower bits (index), and the remaining bits are replaced to upper bits (tag). At this time, bit assignment to the tag and index itself is important, but the tag or index can have an arbitrary bit order. In this manner, the tag to be selected by the selector 204B is changed.

Furthermore, in step S507 the bit order converter 304 outputs a reset signal to the change frequency counter 311, which are reset in response to the reset signal.

In step S508, the bit order converter 304 outputs a dirty control signal to the cache unit 204. Upon reception of the dirty control signal, the cache unit 204 invalidates the tag in the cache. This processing is done because the LUT address is converted and no longer corresponds to the upper address stored in a tag memory.

As described above, in the information processing apparatus according to this embodiment, if it is determined that the hit rate is less than the predetermined value, the bit order is replaced so that the bits at the bit positions corresponding to the larger count values of the change frequency counters become lower bits of the LUT address.

In this way, the hit rate can be improved. This is primarily based on the characteristics that the cache unit has a hierarchical configuration of a tag and index, and it is determined that there is no cache data if a tag of the cache unit corresponding to that (upper bits) of the LUT address is not found.

That is, when viewed from the cache unit 204, bits with higher change frequencies of LUT address are replaced to lower bits (index of the LUT) and those with lower change frequencies are replaced to upper bits (tag of the LUT). As a result, the probability of the presence of a tag of the cache which matches that of the LUT address rises, thus improving the hit rate.

5. Embodiment

An embodiment of the LUT address conversion processing in the information processing apparatus according to this embodiment will be described below. As an embodiment, an LUT address A1 output from the bit order converter 304 is defined as follows:

LUT address A1=[b14, b13, b12, b11, b10, b9, b8, b7, b6, b5, b4, b3, b2, b1, b0]

Note that the number if '[ ]' represents 1 bit, and ',' represents bit concatenation to have the left end as the MSB and the right end as the LSB. Eight bits (b14, b13, . . . , b7) define the tag of the LUT address, and seven bits (b6, b5, . . . , b0) define the index of the LUT address.

Figure 6:
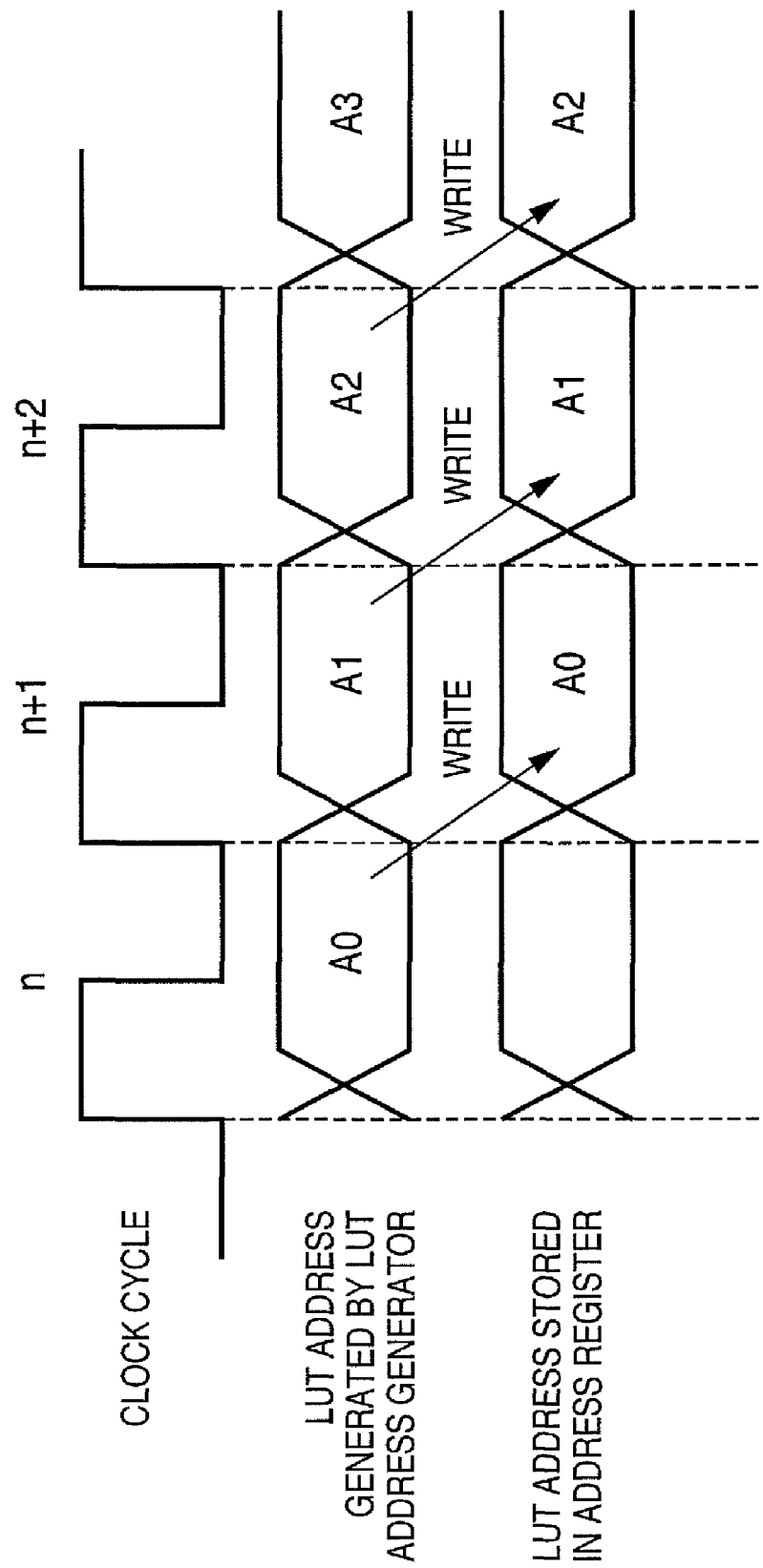
FIG. 6 is a chart showing the operation timings of an LUT address comparison unit 302 which forms the information processing apparatus according to one embodiment of the present invention.

FIG. 6 is a timing chart of the LUT address output from the bit order converter 304, and that stored in the address register 321. An LUT address A0 stored in the address register 321 at time n+1 in FIG. 6 is defined as follows:

LUT address A0=[r14, r13, r12, r11, r10, r9, r8, r7, r8, r5, r4, r3, r2, r1, r0]

Therefore, at time n+1, the LUT address comparator 202 compares the LUT addresses A1 and A0, i.e., b0 and r0, b1 and r1, b2 and r2, . . . , b14 and r14.

If a comparison result for each bit is a match, '0' is output for that bit; if it is a mismatch, '1' is output. Note that the LUT address A1 (that output from the bit order converter 304) is written in the address register 321 in the next cycle. In the same manner as described above, the LUT address A1 is compared with an LUT address A2 output from the bit order converter 304 bit by bit, and comparison results are output. This processing is repeated.

Assume that when the hit rate is less than the predetermined value, the count values of the change frequency counters 211 (count values: c0, c1, c2, . . . , c14) for 15 bits corresponding to the respective bits of the LUT address are as follows:

Count values of change frequency counters:
c6>c14>c3>c4>c11>c13>c12>c0>c2>c5>c8>c9>c7>c10>c1

Also, assume that the number of bits of the index is 7 (bits). In this case, the address conversion signal generator 312 selects upper 7 bits with larger count values (c6, c14, c3, c4, c11, c13, and c12), and outputs bit numbers indicating their bit positions as an address conversion signal, as shown in FIG. 7.

The bit order converter 304 generates bit positions, which form the index of the LUT address, as shown in FIG. 8, based on the address conversion signal shown in FIG. 7, and uses the bits of the LUT address corresponding to these bit positions as the index of the LUT address. Also, the bit order converter 304 changes the bits of the LUT address corresponding to other bit positions to the tag of the LUT address, thus generating the following new LUT address:

Converted LUT address A1=[b1, b2, b0, b5, b10, b9, b8, b7, b6, b11, b4, b3, b13, b14, b12]

As can be seen from the above description, in the information processing apparatus according to this embodiment, when the hit rate becomes less than the predetermined value, the LUT address is converted according to the characteristics of the input data, and the cache unit 204 is then accessed. For this reason, the cache unit 204 can be efficiently used, and a hit rate required to complete processing within a predetermined period of time using a small cache memory size can be assured. That is, the cache size can be reduced while maintaining a high hit rate, thus improving cost performance in color space conversion.

Second Embodiment

The first embodiment generates the address conversion signal from all bits (e.g., 15 bits) of the LUT address. However, the present invention is not particularly limited to this.

For example, in a mode of filling a cache in a predetermined unit (to be referred to as a "line" hereinafter) to improve the fill efficiency of the cache, the number of entries of a tag memory that stores cache tags can be reduced. For example, if the predetermined unit is "16", b=4, and lower 4 bits are reduced from the address input of the tag memory (such bits will be referred to as burst bits hereinafter).

Hence, the LUT address excluding the burst bits may be input to the LUT address comparator 302. That is, the contents of an address register having the bit width of the LUT address excluding the burst bits may be compared with the LUT address excluding the burst bits, and an address conversion signal may be generated based on the change frequency counters 311 as many as the number of bits. In this case as well, the same effects as in the first embodiment can be expected.

More specifically, for example, if an LUT address is 15 bits, and burst bits are 4 bits, a 11-bit LUT address is input to the LUT address comparator 302. Then, the same effect can be expected by generating an address conversion signal using the 11-bit address register and the change frequency counters 311 for 11 bits. As a result, since fill data of the cache can be burst transferred, the fill efficiency remains nearly the same even when the LUT address conversion is made.

Third Embodiment

In the first and second embodiments, processing without any pre-scan has been described. However, the present invention is not limited to this. In case of processing with a pre-scan (or conversion of an identical image), the method of generating an LUT address of a main scan is determined based on the values of the change frequency counters 311 for respective bits from the beginning to the end of the pre-scan. For this reason, since the LUT address output from the LUT address generator 301 is generated only at the end of the pre-scan, the bit order converter 304 does not output any dirty control signal.

Since only the change frequency counters 311 for respective bits and the hit rate discrimination unit 206 operate during the pre-scan, the cache need not be filled. For this reason, the processing can be speeded up.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus. In this case, the functions are implemented when a computer (or a CPU or MPU) of the system or apparatus reads out and executes the program code stored in the storage medium. Note that, in this case, the storage medium which stores the program code constitutes the present invention.

As the storage medium for supplying the program code, for example, a hard disk, optical disk, magneto-optical disk, CD-ROM, CD-R, nonvolatile memory card, ROM, and the like may be used.

The present invention is not limited to a case wherein the functions of the above-mentioned embodiments are implemented when the computer executes the readout program code. For example, the present invention also includes a case wherein an OS (operating system) running on the computer executes some or all of actual processing operations on the basis of an instruction of the program code to implement the functions of the above-mentioned embodiments.

Furthermore, the present invention also includes a case wherein the functions of the above-mentioned embodiments are implemented after the program code read out from the storage medium is written in a memory of a function extension board or a function extension unit, which is inserted in or connected to the computer. That is, the present invention also includes a case wherein after the program code is written in the memory, a CPU or the like of the function extension board or function extension unit executes some or all of actual processing operations to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-353986 filed on Dec. 7, 2005, which is hereby incorporated by reference herein in its entirety.

What is claimed is:

1. A data caching apparatus for generating a memory address for requesting data to convert-input image data, comprising:
    a selection unit configured to select a predetermined position of the bits of the memory address;
    a checking unit configured to check if a first memory stores the requested data based on the predetermined position of the bits of the memory address selected by said selection unit;
    a hit rate discrimination unit configured to calculate a hit rate which indicates a rate of the first memory storing the requested data based on a result of the checking unit; and
    a bit order converter configured to replace the order of the bits of the memory address so that another position of the bits of the memory address is selected by said selection unit in a case that the hit rate is smaller than a predetermined value.

2. The apparatus according to claim 1, wherein said bit order converter replaces the order of the bits of the memory address based on high frequencies of bits of the memory address so that said another position of the bits of the memory address is selected by said selection unit.

3. The apparatus according to claim 1, wherein said bit order converter replaces an arrangement order of respective bits of the memory address in accordance with the characteristics of the memory address so that said another position of the bits of the memory address is selected by said selection unit.

4. The apparatus according to claim 1, wherein said bit order converter comprises a unit configured to invalidate a tag of the first memory when said bit order converter replaces the order of the bits of the memory address so that said another position of the bits of the memory address is selected by said selection unit.

5. The apparatus according to claim 1, further comprising a comparison unit configured to compare a plurality of memory addresses, and an accumulation unit configured to accumulate comparison results by said comparison unit, wherein said bit order converter replaces the order of the bits of the memory address in accordance with the comparison result accumulated by said accumulation unit so that said another position of the bits of the memory address is selected by said selection unit.

6. A data caching method for generating a memory address for requesting data to convert input image data, comprising:
    selecting a predetermined position of the bits of the memory address;
    checking if a first memory stores the requested data based on the predetermined position of the bits of the memory address selected in the selecting step;
    calculating a hit rate which indicates a rate of the first memory storing the requested data based on a result of the checking step; and
    bit order converting the order of the bits of the memory address so that another position of the bits of the memory address is selected in the selecting step in a case that the hit rate is smaller than a predetermined value;
    wherein one or more of said steps of selecting, checking, calculating and bit order converting being implemented in a data caching apparatus.

7. The method according to claim 6, wherein the bit order converting step replaces the order of the bits of the memory address based on high frequencies of bits of the memory address so that said another position of the bits of the memory address is selected.

8. The method according to claim 6, wherein the bit order converting step replaces an arrangement order of respective bits of the memory address in accordance with the characteristics of the memory address so that said another position of the bits of the memory address is selected.

9. The method according to claim 6, further comprising the steps of comparing a plurality of memory addresses, and accumulating comparison result in said comparing step, wherein said bit order converting step replaces the order of the bits of the memory address in accordance with the comparison result accumulated in said accumulating step so that said another position of the bits of the memory address is selected in said selecting step.

10. A non-transitory storage medium for storing a computer program for a data caching apparatus for generating a memory address for requesting data to convert input image data, comprising:
   selecting a predetermined position of the bits of the memory address;
   checking if a first memory stores the requested data based on the predetermined position of the bits of the memory address selected in the selecting step;
   calculating a hit rate which indicates a rate of the first memory storing the requested data based on a result of the checking step; and
   bit order converting the order of the bits of the memory address so that another position of the bits of the memory address is selected in a case that the hit rate is smaller than a predetermined value.

11. The storage medium according to claim 10, further comprising the steps of determining whether or not the order of the bits of the memory address is to be replaced based on a rate of the checking result indicating that the first memory does not store the requested data corresponding to the predetermined position of the bits of the memory address.

12. The storage medium according to claim 10, wherein the bit order converting step replaces the order of the bits of the memory address so that position of the bits of the memory address corresponding to change frequencies of respective bits of the memory address is selected in the selecting step.

13. The storage medium according to claim 10, wherein the bit order converting step replaces an arrangement order of respective bits of the memory address in accordance with the characteristics of the memory address.

14. The storage medium according to claim 10, further comprising comparing a plurality of memory addresses, and accumulating comparison result in said comparing step, wherein said bit order converting step replaces the order of the bits of the memory address in accordance with the comparison result accumulated in said accumulating step so that said another position of the bits of the memory address is selected in said selecting step.

* * * * *